United States Patent [19]
Onishi et al.

[11] Patent Number: 5,224,096
[45] Date of Patent: Jun. 29, 1993

[54] FRAME STRIP METHOD AND APPARATUS THEREFOR

[75] Inventors: Katsuyoshi Onishi; Koichi Kimura, both of Yokohama; Mitsuhiro Yamaga, Kawasaki; Osamu Takada, Sagamihara; Masahito Sasaki, Odawara, all of Japan

[73] Assignee: Hitachi, Ltd., Tokyo, Japan

[21] Appl. No.: 583,506

[22] Filed: Sep. 17, 1990

[30] Foreign Application Priority Data

Sep. 22, 1989 [JP] Japan .................. 1-245091

[51] Int. Cl.⁵ .................. H04J 3/16
[52] U.S. Cl. .................. 370/85.5; 370/85.14
[58] Field of Search ........ 370/85.5, 85.12, 85.13, 370/85.14, 85.15, 94.1, 85.4

[56] References Cited

U.S. PATENT DOCUMENTS 4,932,023 6/1990 Geyer et al. .................. 370/85.15
5,111,453 5/1992 Morrow .................. 370/85.13

FOREIGN PATENT DOCUMENTS 0146831 7/1985 European Pat. Off.
0164000 12/1985 European Pat. Off.
0328004 8/1989 European Pat. Off.
3507582 9/1986 Fed. Rep. of Germany.
01-206755 8/1989 Japan .................. 370/85.14

OTHER PUBLICATIONS

Henry Yang, et al., "Proposal on Frame Stripping for Bridges in FDDI", Digital Equipment Corp., Jun. 16, 1989, pp. 1-12.
S/N 520,712, Takada, et al., Filing date May 8, 1990.

Primary Examiner—Douglas W. Olms
Assistant Examiner—Melvin Marcelo
Attorney, Agent, or Firm—Fay, Sharpe, Beall, Fagan, Minnich & McKee

[57] ABSTRACT

A frame strip method for a bridge circuit for transparently forwarding data between a plurality of LANs (Local Area Network) without frame infinite circulation. The numbers of transmission/receive frames are counted. In counting the number, the validity/invalidity of a transmission frame is judged in accordance with the kind of the transmission frame. The validity/invalidity and strip/receive of a receive frame are judged in accordance with the kind of the receive frame. In accordance with the numbers of valid transmission/receive frames, a receive frame is stripped from the transmission line if the condition of (transmission frame number) > (-receive frame number) is met.

12 Claims, 15 Drawing Sheets

FIG. 2

| STAGE | EVENT | TOKEN NOT CAPTURE | TOKEN CAPTURE | RECEIVE FRAMES EXCEPT MAC FRAME | | | | RECEIVE MAC FRAME | FRAME TRANSMISSION | | | TOKEN TRANSMISSION |
|---|---|---|---|---|---|---|---|---|---|---|---|---|
| | | | | RECEIVE ABNORMAL FRAME | RECEIVE NORMAL FRAME | | | | MAC FRAME SMT FRAME | EXCEPT MAC FRAME | ABORTED FRAME | |
| | | | | | SMT FRAME SA UNMATCH | OTHER FRAME | | | | | | |
| | | | | | | | TFG OFF AND CNT=0 | CNT≠0 | | | | |
| 1 REPEAT | OPERATION | — | CNT RESET TFG ON | — | — | — | — | — | — | — | — | — |
| | TRANSIT TO | 1 | 2 | 1 | 1 | 1 | 1 | 1 | 1 | 1 | 1 | 1 |
| 2 STRIP | OPERATION | TFG OFF | CNT RESET TFG ON | — | — | (CNT-1) DIRECT TO STRIP | | | TFG OFF | — | (CNT+1) | TFG OFF |
| | TRANSIT TO | 1 | 2 | 2 | — | 1 | 2 | 1 | 2 | 2 | — | 2 |

TFG = TRANSMISSION FLAG
CNT = COUNTER

CIRCULATION ON COUNTER UNMATCH

AVOID OF CIRCULATION

EXCESS STRIP

AVOID OF TOKEN STRIP

FIG. 12A

TOKEN

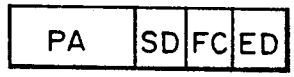

FIG. 12B

VALID FRAME

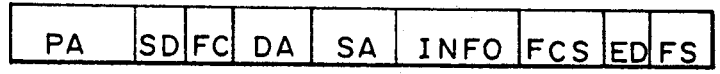

FIG. 12C

INVALID FRAME

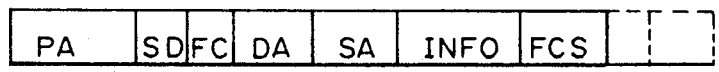

```
P A : PREAMBLE          ( ≧ 16 SYMBOLS )
S D : START DELIMITER   (    2 SYMBOLS )
F C : FRAME CONTROL     (    2 SYMBOLS )
D A : DESTINATION ADDRESS (  2 SYMBOLS )
S A : SOURCE ADDRESS    (   12 SYMBOLS )
I N F O : INFORMATION   ( ≧  0 SYMBOLS )
F C : FRAME CHECK SEQUENCE (  8 SYMBOLS )
E D : END DELIMITER     (    1 SYMBOLS )
F S : FRAME STATUS      ( ≧  3 SYMBOLS )
```

FIG. 12D

| FC | | KINDS |
|---|---|---|
| XX00 0000 | | INVALID FRAME OR TOKEN |
| 0000 0001 | to 1111 | SMT FRAME |
| 0100 0001 | to 1111 | SMT FRAME |
| 1000 0001 | to 1111 | MAC FRAME |
| 1100 0001 | to 1111 | MAC FRAME |
| X001 XXXX | | LLC FRAME |
| X010 XXXX | | LLC FRAME |
| X101 XXXX | | IMPLEMENT FRAME |
| X110 XXXX | | IMPLEMENT FRAME |
| X011 XXXX | | RESERVED |
| X111 XXXX | | RESERVED |

FRAME STRIP METHOD AND APPARATUS THEREFOR

BACKGROUND OF THE INVENTION

The present invention relates to a frame strip system, and more particularly to a method of and apparatus for stripping a returned transmission frame of a communication apparatus connected to a ring-type medium.

In a ring-type Local Area Network (LAN) with a plurality of stations being connected to the same medium, it is necessary for a transmission station to strip reliably and by all means a frame transmitted onto LAN. According to a known transmission frame strip method, whether or not a transmission frame circulated on the ring once is a returned "my" transmission frame, is judged by searching a source address (SA) included in the receive frame. Namely, the transmission station checks a match of my address (MA) with the source address (SA) to confirm that the presently received frame is my transmission frame that has circulated the ring once and returned thereto, and the received frame is stripped.

In a network system having a plurality of LANs connected via a forward apparatus (bridges) and having a single LAN structure in a logical sense, in order to ensure transparency of a frame passing from one LAN to another LAN, transparency of the source address (SA) of the forward frame should be guaranteed. Specifically, the source address of a frame received from one LAN is forwarded to another LAN without referencing it to my address (MA) assigned to the forward apparatus. As described above, it becomes therefore impossible to discriminate the returned transmission frame by checking a match of MA with SA. According to a related technique, this problem is solved by a method of stripping received frames same in number as transmission frames, as disclosed, e.g., JP-A-1-206755 laid open on Aug. 18, 1989.

This related technique however does not consider how an error frame and a special frame are processed in stripping returned transmission frames, to thereby leave a possibility of infinite frame circulation.

There is known another related technique for stripping a frame, as disclosed in Digital Equipment Corp. (DEC), Henry Yang, K. K. Ramakrishnan and Bill Hawe, "Proposal on Frame Stripping for Bridges in FDDI", Jun. 16, 1989.

SUMMARY OF THE INVENTION

It is an object of the present invention to provide a method of stripping a returned transmission frame at a bridge which transparently forwards data between LANs.

It is another object of this invention to provide a method of stripping a frame without infinite circulation at a bridge circuit which transparently forwards data between LANs.

It is a further object of this invention to provide a method of and apparatus for stripping a frame without disturbing FDDI (Fiber Distributed Data Interface) protocol at a bridge circuit which transparently forwards data between FDDI rings.

It is a still further object of this invention to provide a bridge apparatus which can reliably forward information from one network to another in a multinetwork system and operate as a LAN node of FDDI protocol.

The above objects of the present invention can be achieved by the provision of a communication apparatus of the type that it is connected to a ring type transmission line wherein, data is transmitted/received on a frame unit basis, the numbers of transmission/receive frames are counted, a receive frame is stripped so long as the condition of (transmission frame number)>(receive frame number) is met, wherein a validity/invalidity of transmission number is judged in accordance with the kind of a transmission frame, and a validity/invalidity of receive number and a strip/repeat of a receive frame are judged in accordance with the kind of the receive frame.

For example, as the judgment of whether a transmission frame is counted or not, a frame of a first kind is counted, but a frame of a second or third kind is not counted. As the judgment of whether a receive frame is counted or not, a normal frame of the first kind is counted, but a frame of the second or third kind or an error frame is not counted. As the judgment of whether a strip or repeat operation is executed, a frame of the first kind is stripped.

Counting the number starts when a right of transmission is given, and terminates when the transmission right is released and the condition of transmission frame number=receive frame number is met, when another transmission right is received, or when a frame of a second kind is received.

As the strip/repeat judgment, if the source address of a receive frame coincides with my address, it is stripped irrespective of the kind of the received frame.

According to the present invention, the frame of the first kind is preferably a logical link control (LLC) frame or an implementor (IMP) frame stipulated by FDDI conforming with American National Standards Institute (ANSI) 3T9.5.

The frame of the second kind is preferably a media access control (MAC) frame stipulated by FDDI conforming with ANSI3T9.5.

The frame of the third kind is preferably a station management (SMT) frame stipulated by FDDI conforming with ANSI3T9.5.

The error frame is preferably a frame with an error indication or a frame with a frame check sequence (FCS) error detected.

The right of transmission is represented by a token defined by a LAN using a token passing scheme.

According to the present invention, while a frame of the first kind is transmitted, a first mode is set. During the first mode, a receive frame is stripped from the transmission line under the condition of (transmission frame number)>(receive frame number). While a frame of the third type is transmitted, a second mode is set. During this mode, a receive frame having a match between my address and source address is stripped.

BRIEF DESCRIPTION OF THE DRAWINGS

FIG. 2 shows a stage matrix used for explaining an embodiment of the frame strip control of this invention;

FIGS. 12A to 12D are schematic diagrams used for explaining this invention and the structure of a token, valid frame and invalid frame;

DESCRIPTION OF THE PREFERRED EMBODIMENTS

Embodiments of this invention will be described in detail with reference to the accompanying drawings.

1. OUTLINE OF STRUCTURE

Figure 3:
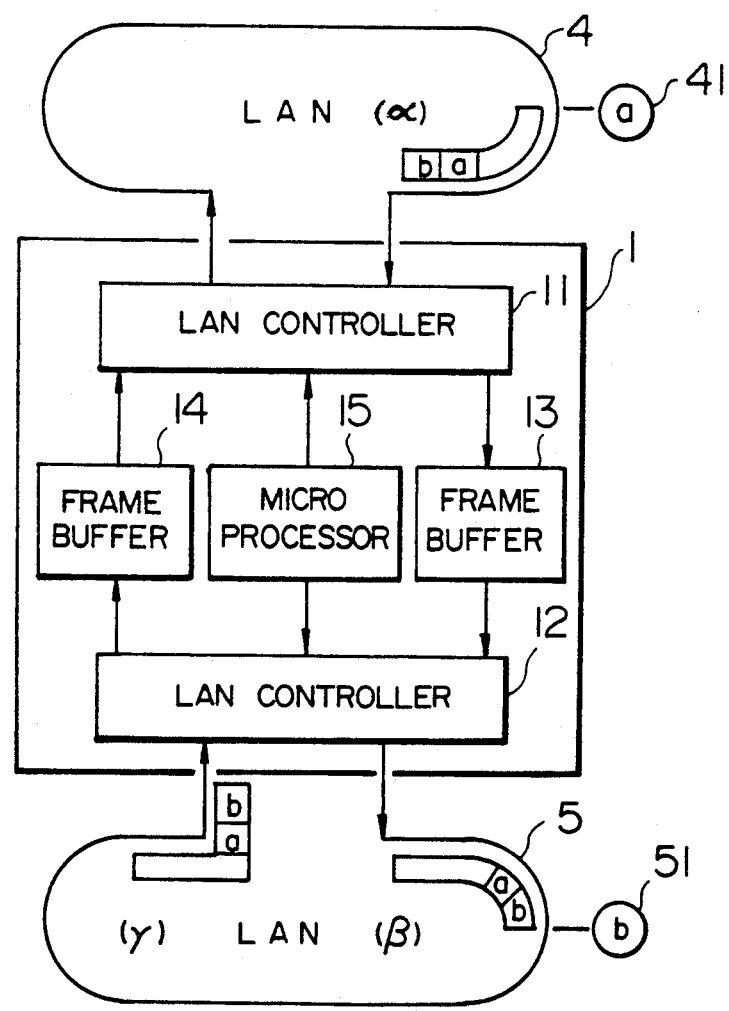
FIG. 3 shows the outline of a communication system having a bridge function for interconnecting two LANs and forwarding data therebetween.

FIG. 3 shows the structure of a fundamental system to which the present invention is applied. In FIG. 3, a communication apparatus 1 connecting two LANs 4 and 5 has a data forward bridge function. The communication apparatus 1 is constructed of LAN controllers 11 and 12 for data transfer to and from LANs 4 and 5 on a frame unit basis, frame buffers 13 and 14 for storing forward data from LAN 4 to LAN 5 and from LAN 5 to LAN 4 respectively, and a microprocessor 15 for the control of the communication apparatus 1 and for the frame forward control. Reference numerals 41 and 51 represent stations connected to LANs 4 and 5 respectively. The addresses of the stations 41 and 51 are given as a and b, respectively.

A frame forward process from LAN 4 to LAN 5 in the system constructed as above will be described.

The flow of a frame will be described assuming that it is transmitted from the station 41 (station address a) connected to LAN 41 to the station 51 (station address b) connected to LAN 5. In this case, the station 41 transmits the frame by adding the destination address (DA) of b and the source address (SA) of a ($\alpha$). The communication apparatus 1 receives the frame from LAN 4 and forwards it to LAN 5 ($\beta$).

In order to realize a transparent bridge, it is necessary for a forward apparatus to ensure transparency of a forward frame. In view of this, the communication apparatus 1 transmits SA of the forward frame to LAN 5 in a transparent manner without referencing it to my address (MA), to thereby realize a transparent bridge. The frame forwarded to LAN 5 circulates the ring once and reaches again the communication apparatus 1. The communication apparatus 1 which forwarded the frame to LAN 5 also serves as a general station connected to LAN 5. Namely, the communication apparatus 1 is required to take the roll of a transmission station and strip the returned transmission frame reliably ($\gamma$). However, as described above, at the forward apparatus interconnecting LANs, SA and MA of the returned transmission frame are not related to each other. Therefore, it is not possible to use the method of checking a match between SA and MA, which is a method used by a general station for discriminating a returned transmission frame.

A particularity associated with a conventional method of stripping a returned transmission frame at a transparent bridge has been clarified above. Next, with reference to the accompanying drawings there will be described in detail a method of stripping a returned transmission frame not referenced to MA according to an embodiment of this invention. This bridge structure was filed by the present applicant on May 8, 1990 as U.S. Ser. No. 520,712, O. Takada et al., "Bridge Apparatus and a Communication System Between Networks Using the Bridge Apparatus".

Figure 1:
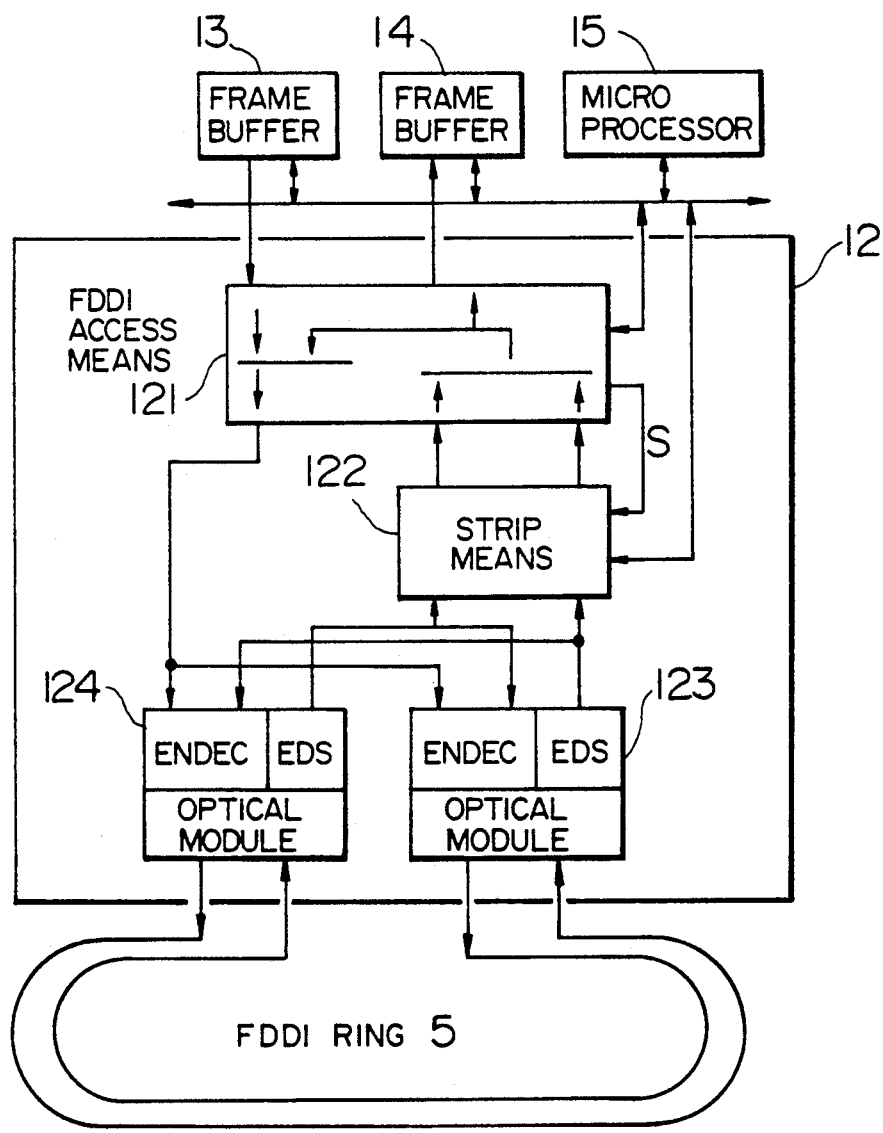
FIG. 1 shows an embodiment of a LAN controller by which a frame strip method of this invention is executed.

A Fiber Distributed Data Interface (FDDI) controller 12 shown and described in FIG. 1 is an embodiment of the LAN controller shown in FIG. 3. The FDDI controller 12 is constructed of FDDI access means 121, strip means 122 for stripping a frame, and serial interfaces 123 and 124. FDDI access means 121 may be implemented using, for example, Am79C83 (FORMAC), Amz7981A (RBC), and Am79C82A (DPC) manufactured by AMD Corp., and the serial interfaces 123 and 124 may be implemented using, for example, Am7984 (ENDEC), Am7985A (EDS) and an optical module DM74-742-XF manufactured by Sumitomo Electric Industries Ltd. Strip means 122 is positioned between the serial interfaces 123 and 124 and FDDI access means 121, and strips a frame (returned my transmission frame) received from the serial interfaces 123 and 124.

2. 1ST EMBODIMENT OF FRAME STRIP

2.1 SUMMARY

As described before, a bridge transmits a frame by using as SA an address different from its media access control (MAC) address in order to realize a bridge function. Therefore, strip means 122 has a function to strip a frame outside the FDDI access means 121. More in particular, the basic functions of strip means 122 include:

(1) counting the number of frames transmitted from the bridge; and (2) while monitoring the receive bus, stripping frames same in number as that of transmitted frames.

The received data is sent to FDDI access means 121 via the serial interface 123 and strip means 122, and sent again to the ring via the serial interface 124. This path is a repeat path. In order to strip, a frames strip means 122 replaces the symbol train of the received frame with an idle symbol (I).

FIG. 2 shows a stage matrix of strip means 122. The stage matrix includes a repeat stage and strip stage.

A frame is transmitted in the following manner. The microprocessor 15 activates FDDI access means 121 in order to transmit a forward frame to LAN (FDDI ring) 5. When FDDI access means 121 captures a token, strip means 122 transits from the repeat stage to the strip stage to thereby execute a strip operation of a received frame.

Figure 4:
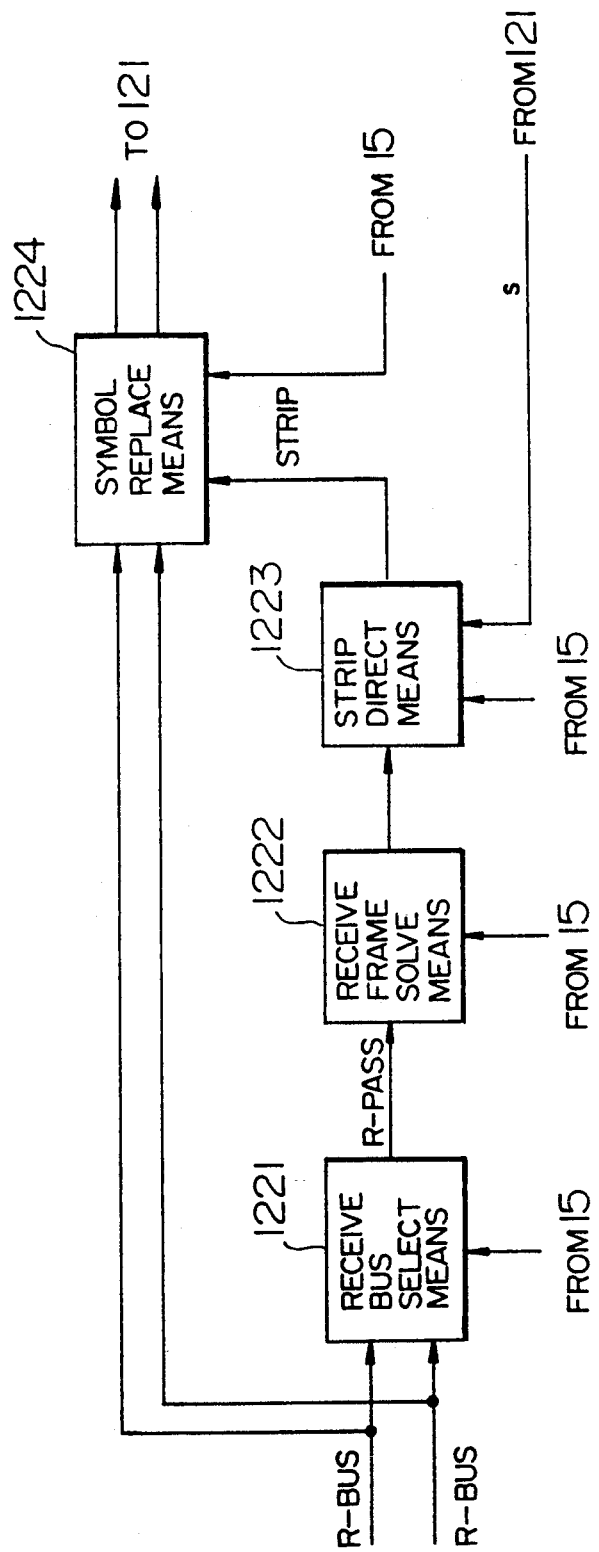
FIG. 4 is a block diagram showing an embodiment of strip means of the first embodiment of the LAN controller of this invention.

FIG. 4 shows the structure of strip means 122. In FIG. 4, reference numeral 1221 represents receive bus select means which selects one receive bus (R-BUS) from two serial interfaces in accordance with an instruction from the microprocessor 15, 1222 receive frame solve means for analyzing a received frame, 1223 strip direct means for the strip control using the stage matrix shown in FIG. 2, 1224 symbol replace means for replacing the received symbol with an idle symbol (I) in accordance with a strip direction and sending it to FDDI access means 121.

2.2 NORMAL CASE

The operation of the normal case will be described first. FDDI access means 121 waits until a token is captured for transmission of a frame. Upon capture of a token, frames in the frame buffer 13 are sequentially sent to the FDDI ring 5. Strip direct means 1223 is notified by a stage signal s received from FDDI access means 121 that a token has been captured, and causes a frame counter (CNT) to reset and a transmission flag to turn on, as shown in FIG. 2. Thereafter, the operation transits to the strip stage. While holding this strip stage, strip direct means 1223 decodes the stage signal s and increments the transmission counter each time a frame is transmitted.

After circulating the ring once, the transmission frame reaches its station. Receive frame solve means 1222 analyzes a receive symbol train, and when a receive frame is discriminated, receive frame solve means instructs strip direct means 1223 to count up a receive counter. Strip direct means 1223 increments the receive counter. The period under the condition of (transmission frame number)>(receive frame number) means that my transmission frame is still present on the ring. While this condition is satisfied, strip direct means 1223 instructs symbol replace means 1224 to strip a frame. Symbol replace means 1224 strips a receive frame by replacing the receive symbol train to be transmitted to FDDI access means 121 with an idle symbol (I) train. If the token is transmitted thereafter, it means the end of transmission so that strip direct means 1223 turns off the transmission flag (TFG).

Stripping a receive flag in the above manner continues until all my transmission frames present on the ring have circulated once, i.e., until the conditions becomes (transmission counter value) =(receive counter value). The conditions of the end of the strip stage are that TFG turns off and (transmission counter value)=-(receive counter value). When the conditions are met, strip direct means 1223 returns to the repeat stage.

Figure 9:
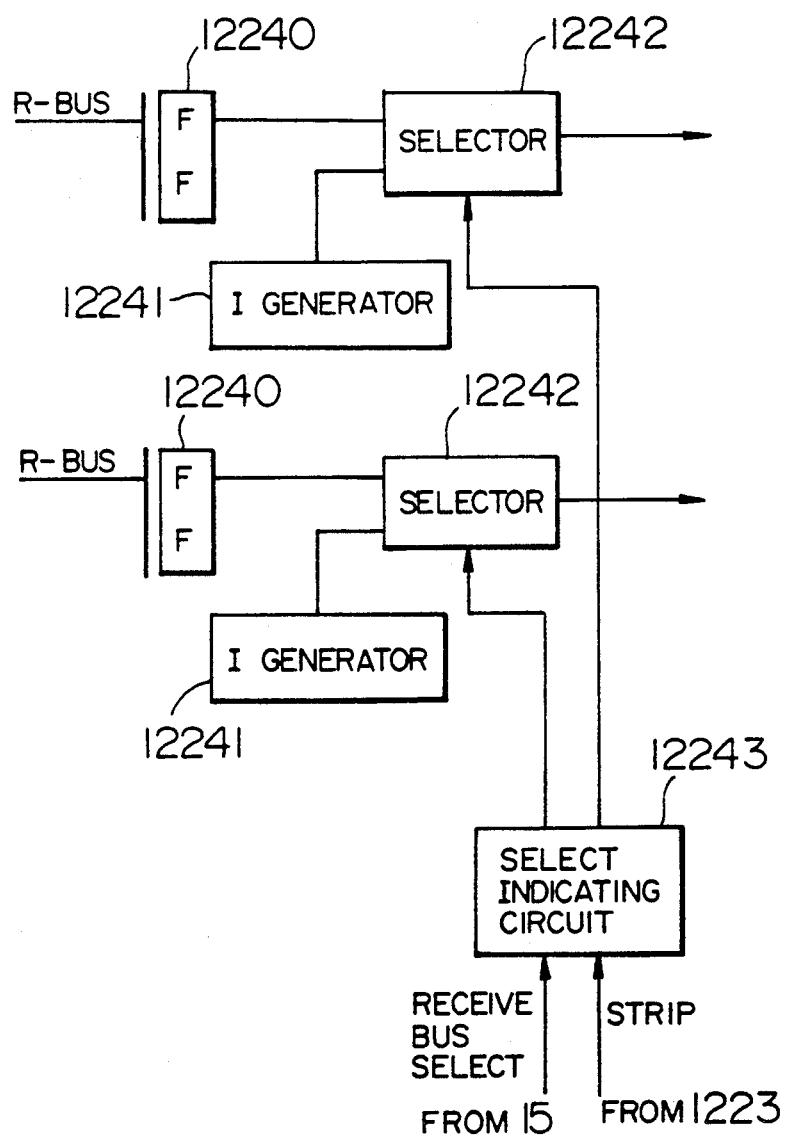
FIG. 9 is a block diagram showing an embodiment of symbol replace means 1224 shown in FIG. 4.

FIG. 9 shows the detail of symbol replace means 1224. I generator 12241 generates I symbols. A select indicating circuit 12243 selects one of selectors 12242 to select either a symbol train from a flip-flop (FF) circuit 12240 or generated I symbols. This selection is determined in accordance with a strip direct signal (strip) from strip direct means 1223 and a receive bus select instruction from the microprocessor 15 via R-BUS.

The operation of the normal case has been described above. Next, the description is directed to the operation of the abnormal case which is broadly classified into:

(1) reception of an error frame caused by noises or the like; and (2) reception of a claim, beacon, or token from another station at the time of transmission (strip stage). First, the structure of a token and frame (normal, invalid) will be described with reference to FIGS. 12A to 12D.

FIGS. 12A, 12B and 12C show examples of a token, normal frame, and invalid frame, respectively. In these figures, PA represents a preamble field, SD a start delimiter field, FC a frame control field, INFO an information field, FCS a frame check sequence field, ED an end limiter field, and FS a frame status field, each field having a length as shown. One symbol is constructed of, e.g., four bits. In an invalid frame shown in FIG. 12C, fields after the ED field are vanished. FIG. 12D shows the relationship between frame control (FC) and frame kind.

2.3 ERROR FRAME RECEPTION

Figure 10:
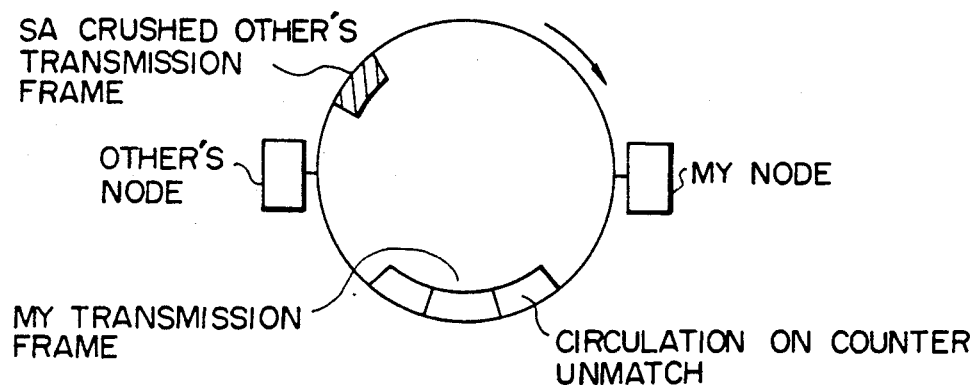
FIG. 10 is a schematic diagram used for explaining this invention and frame infinite circulation.

When a frame error occurs, the following problem arises. Namely, as shown in FIG. 10, a frame transmitted from another node (hereinafter called circulated other's transmission frame) passes and circulates without being stripped at the source, because of SA crush. In such a case, if this circulated other's transmission frame is counted as a returned my transmission frame, there occurs a not-stripped my transmission frame (frame infinite circulation). In view of this, in this embodiment, a frame is stripped but the frame number is not counted under the following conditions;

(1) if a receive frame provides an error indication; or (2) if an FCS error is detected in a receive frame.

The case where a frame error occurs and the above countermeasure is used will be described with reference to FIGS. 11A to 11C.

Figure 11A:
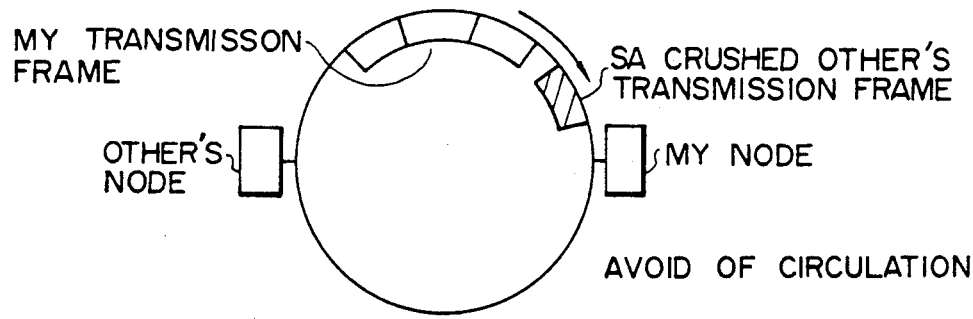
FIGS. 11A to 11C are schematic diagrams used for explaining this invention and an abnormal case.

FIG. 11A illustrates the case where a circulated other's transmission frame underwent SA crush. My transmission frame follows after a circulated other's transmission frame. A circulated other's error transmission frame is not counted as receive frames so that my transmission frames same in number as the number of transmissions can be stripped, without infinite circulation. In this case, the circulated other's error transmission frame is also stripped.

Figure 11B:
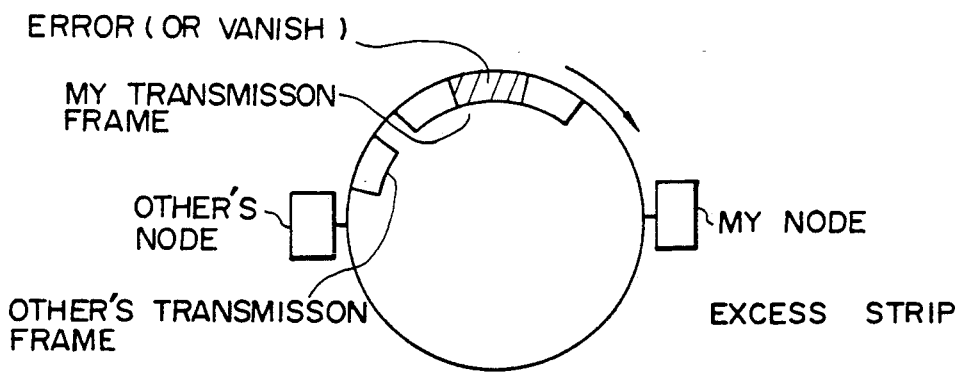

FIG. 11B illustrates the case where my transmission frame is associated with an error (or vanished), and a circulated other's transmission frame follows it. Since an error frame is not counted (or since a vanished frame cannot be counted), a circulated other's transmission frame following a returned my transmission frame will be stripped. In this case, however, it is a basic concept of error prevention countermeasure that preventing frame infinite circulation has the highest priority and that excessive strip is considered as frame vanishment which often occurs. As a result, this excessive strip can be relieved by a response confirmation.

Figure 11C:
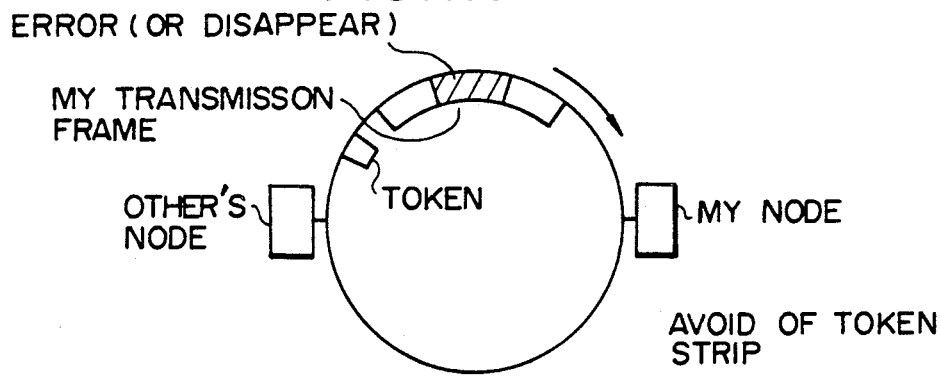

FIG. 11C illustrates the case where my frame is associated with an error (or vanished) and a token follows it. Mismatch between the number of transmission and receive frames is the same as the above described case. In this case, stripping a receive token is inhibited when the token is detected, to thereby prevent the token from being vanished.

The operation of frame strip means 122 upon generation of an error frame will be described in detail. Only normal frames are counted and the criterions for validity judgment include the following conditions which conform with the FDDI specification:

(1) of having a start delimiter (SD);

(2) of having a frame control (FC) excepting "1X00 0000";

(3) of having an added data symbol of 0 or larger;

(4) of having an end delimiter (ED);

(5) of having an effective data length;

(6) of having an effective frame check sequence (FCS); and (7) of not having an error indication in the frame status (FS) field.

Figure 6:
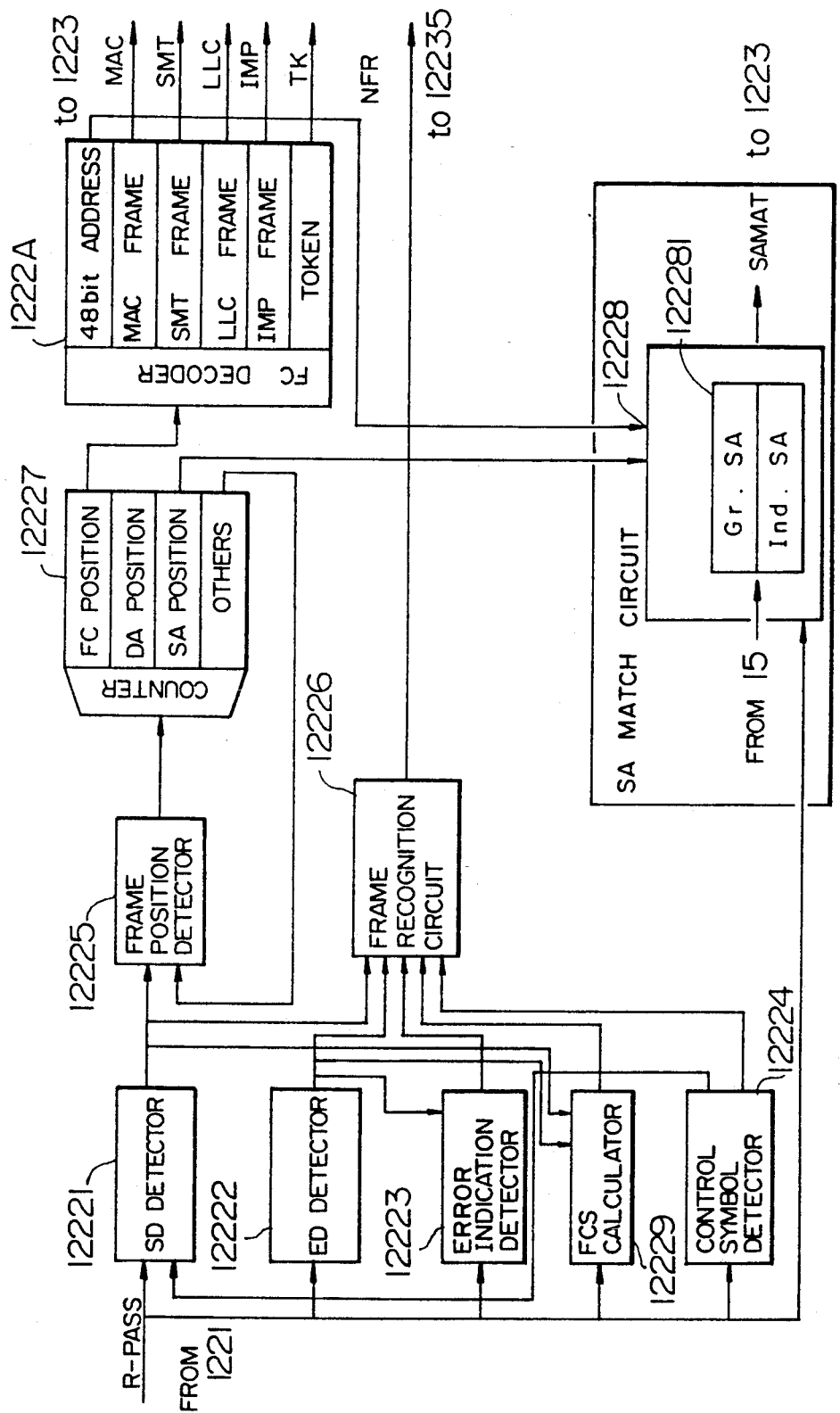

Verification of these conditions is made by receive frame solve means 1222. The detail of receive frame solve means 1222 is shown in FIG. 6. Judgment of a receive frame is performed in the following manner.

In FIG. 6, an SD detector 12221 detects the start delimiter of a frame and an ED detector 12222 detects the end delimiter of the frame. The receive symbol train between SD (JK) and ED (T) is considered as the receive frame. After SD is detected, if a control symbol detector 12224 detects a control symbol (J, K, Q, R, S) other than ED, or an idle symbol (I), the symbol train in concern is considered as an invalid frame. In addition, an FCS calculator 12229 calculates an FCS of the fields from FC to FCS in accordance with a check method stipulated in the FDDI protocol, and sends the frame validity judgment results to a frame recognition circuit 12226 when ED is detected.

Also, upon reception of a frame end timing detected by the ED detector 12222, an error indication detector 12223 confirms if the error indication is not set in the following frame status (FS) field. Under these conditions, the frame recognition circuit 12226 recognizes the symbol train as a receive frame and notifies strip direct means 1223 of a normal frame receive (NFR). The frame count and strip control are executed by strip direct means 1223.

By recognizing a normal frame receive as described above, frame infinite circulation can be avoided which may otherwise occur because of mismatch between transmission/receive numbers.

2.4 MAC/SMT Frame Receive

A MAC (Media Access Control) frame includes two types of frames, claim frame and beacon frame, which are used in the following manner.

Any station, which detects a necessity for initialization or re-initialization of a ring, generates a token request process. In this process, one or more stations transmit claim frames in succession and bids together in order to obtain a right of initialization. Each station monitors input claim frames and compares the bid value of a receive claim frame with its own bid value. A station that receives a lower bid starts bidding. On the other hand, a station that receives a higher bid abandons the right of its ring initialization.

This access control is solved in the following hierarchic manner:

(1) the lowest order (having the largest numerical value) target token rooting time (TTRT) proceeds first.

(2) a bid having a longest address proceeds first.

(3) a bid having a highest address (having a largest numerical value) proceeds first.

The token request process is completed when a returned claim frame that has circulated the ring is received by any one of the stations. At this time, the ring is filled with claim frames which the source station sent, and the other stations abandoned the right of their ring initialization. The authorized station issues a token to initialize the ring.

When a station detects a failure in the token request process, it generates a beacon process. In this case, there is an ample probability of physical defect on the ring.

In the beacon process, a station sends beacon frames in succession. A station always responds to a beacon frame received from an upstream station. As a result, if there is a defective point, a beacon frame usually propagates from a station immediately downstream of the defective point. If a station in the beacon process receives a returned my beacon frame, the station considers that the logical ring has recovered, and generates the token request process for quick recovery of the ring.

As described above, it is not necessary for the transmission of a MAC frame to capture a token. Therefore, there arises the case where a MAC frame is received while a station delivers a transmission frame, i.e., while stripping.

The stripping operation in this case is performed in the following manner.

When a MAC frame is received while stripping, the station transits (refer to FIG. 2) to the repeat stage without stripping it for the reason given below. Namely, if another station transmits a claim frame in the FDDI ring initialization process (unnecessary to capture a token), the other station judges as a ring failure if the claim frame does not circulate the ring, and enters the ring recovery process as described above. It is therefore necessary to repeat a MAC frame to the ring. Although the returned my transmission frame is not stripped thereafter by the station in concern, it is stripped by the other station which transmitted the claim frame, thereby posing no problem of frame infinite circulation.

Specifically, as described above, there are one or more stations authorized in bidding and they are transmitting claim frames, so that they strip a transmission frame on the ring delivered by another station. In this case, therefore, my transmission frame circulating after a claim frame will be stripped without fail at somewhere upstream and will not return to its own station.

Also in the case where a beacon frame is received, my transmission frame will not return to its own station because it is stripped by the beacon frame transmitted station or the ring is defective (e.g., disconnection of the ring). As described above, upon reception of a MABC frame (claim, beacon), the operation quickly transmits to the repeat stage (stage 1 shown in FIG. 2).

The operation of an SMT (Station Management) frame, for example, will be further described. Since an SMT frame can be transmitted without a token, the following case occurs. While a station is in the stripping stage (transmission stage), it sometimes receives an SMT frame transmitted by another station. In this case, if the station counts the circulated other's transmission frame as the returned my transmission frame, mismatch between transmission/receive numbers occurs and hence also infinite circulation because of the not-stripped transmission frame. In addition, the SMT frame should not be stripped so that it is not counted as the returned my transmission frame, but repeated. On the other hand, a station transmitted an SMT frame does not count it as its transmission/receive frame, to thereby ensure a match between transmission/receive numbers. In transmitting an SMT frame, matching of the address of a station with SA is checked so that a frame is stripped in this case in accordance with SA match. Stripping in accordance with SDA match will be later described.

2.5 Strip Operation

The strip operation relying upon discrimination of frame kind as described above will be described in detail with reference to FIG. 6 showing the detail of receive frame solve means 1222.

The SD detector 12221 detects the start of a frame from a symbol train received via R-PASS, and activates a frame position detector 12225 which in turn gives a timing signal to a counter 12227 at each symbol time.

Figure 5:
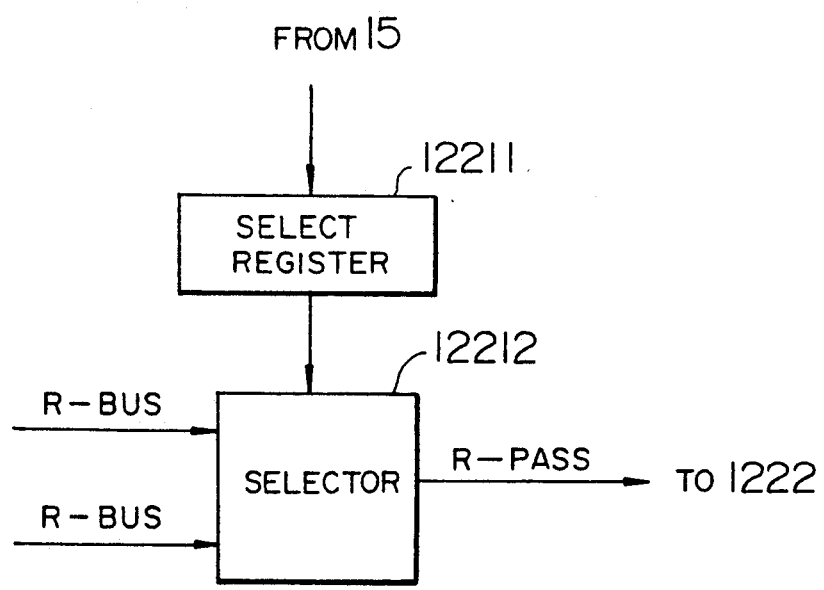
FIGS. 5 to 7 are block diagrams respectively showing embodiments of receive bus select means 1221, receive frame solve means 1222 and strip direct means shown in FIG. 4.

The counter 12227 generates timings representative of field positions (FC, DA, SA) of a frame shown in FIG. 12B. An FC decoder 122A decodes an FC to discriminate the frame kind (MAC frame, SMT frame, LLC frame, token (TK), IMP frame), the discrimination results being notified to strip direct means 1223. In the receive bus select means 1221, a receive bus is selected as shown in FIG. 5 by a selector 12212 in accordance with the contents of a select register 12211 set by the microprocessor 15.

Figure 7:
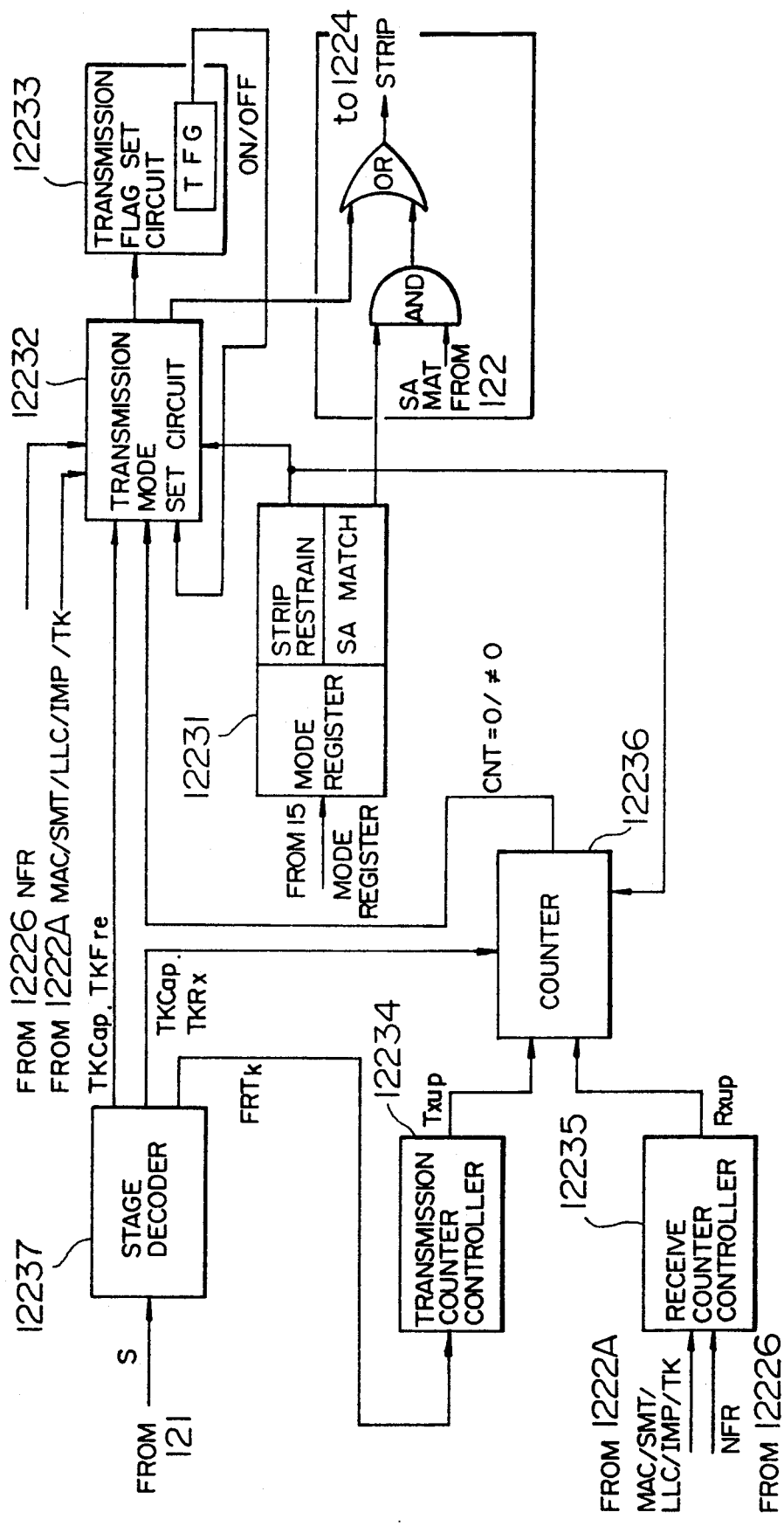

Next, the strip control executed by strip direct means 1223 shown in FIG. 7 will be described. As described previously, an MAC/SMT transmission/receive frame is not counted. The process for discriminating the kind of a transmission frame can be omitted in the following manner.

A mode register 12231 is provided within strip direct means 1223 to provide the following strip restrain mode. In transmitting an SMT frame, the microprocessor 15 sets the mode register 12231 at a strip restrain mode to inhibit stripping by using counters. In this case, a transmission mode set circuit 12232 does not transit to the strip stage. In transmitting an SMT frame, MAC address is used as SA so that strip can be made in accordance with SA match. The strip control by counters is used in transmitting a normal frame (LLC frame) so that the frame kind discrimination is directed to a receive frame, and that the frame kind discrimination for a transmission frame can be omitted.

Next, the detail of strip direct means 1223 shown in FIG. 7 will be described.

A stage decoder 12237 decodes a stage signal (s) received from FDDI access means 121 and gives a frame transmission notice (FRTx) to a transmission counter controller 12234, token capture (TKCap) and token receive (TKRx) notices to a counter 12236, and token capture (TKCap) and token free (TKFre) notices to a transmission mode set circuit 12232.

Upon reception of a token capture notice, the transmission mode set circuit 12232 causes a transmission flag set circuit 12233 to turn on a transmission flag (TFG) to supply a strip indication (Strip) to symbol replace means 1224. In addition, the transmission counter controller 12234 and receive counter controller 12235 are enabled and the count of a counter 12236 is reset.

Figure 8:
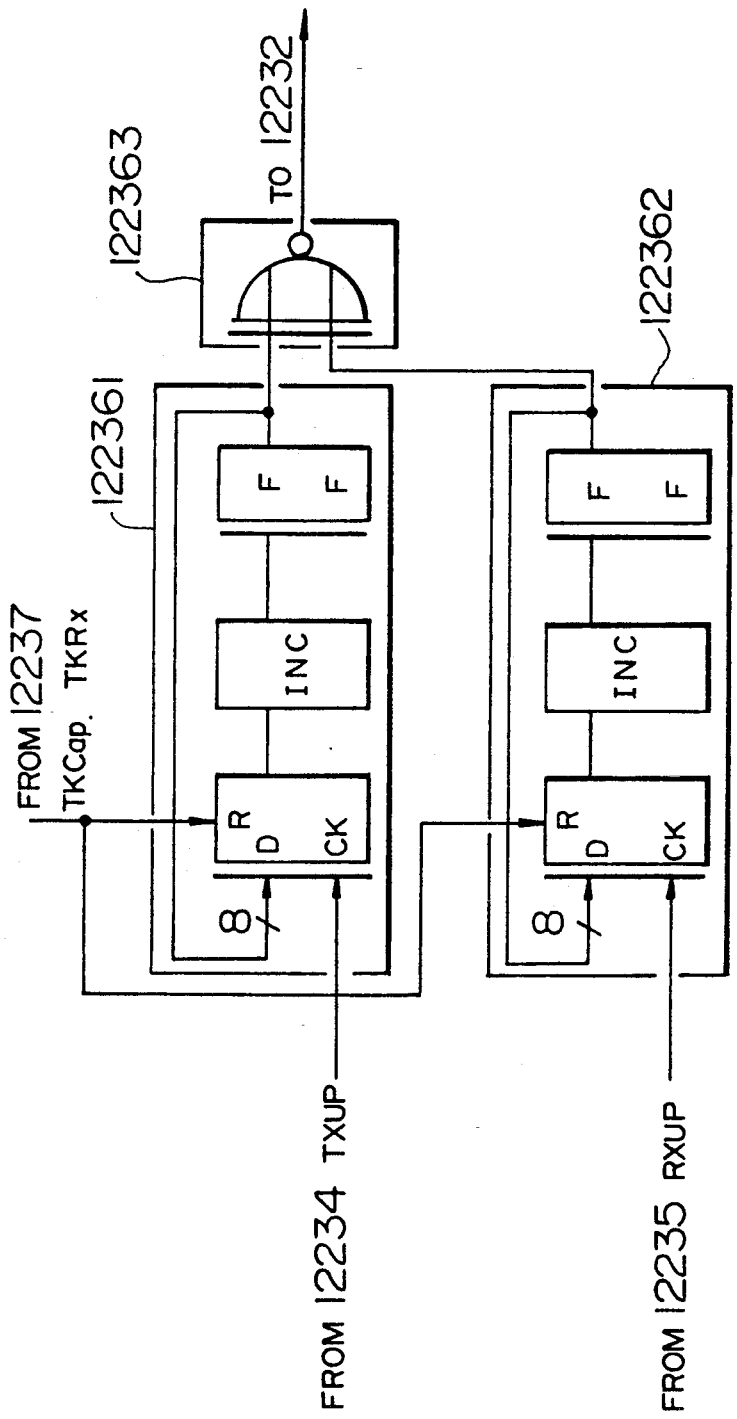
FIG. 8 is a block diagram showing an embodiment of the counter 12236 shown in FIG. 7.

The transmission counter controller 12234 gives a transmission counter-up (Txup) indication to the counter 12236 each time a transmission signal is received from the transmission stage decoder 12237. On the other hand, the receive counter controller 12235 gives a receive, counter-up (Rxup) indication to the counter 12236 when a normal LLC frame is received, in accordance with a frame discrimination notice and a normal/abnormal notice received from receive frame solve means 1222. The counter 12236, an embodiment thereof being shown in FIG. 8, is constructed of a transmission counter 122361, receive counter 122362, and compare logic 122363. The transmission counter 122361 and receive counter 122362 are incremented by an up indication as described above, and the compare logic 122363 judges a match betwen both counts. A match (CNT=0)/mismatch (CNT≠0) is notified to the transmission mode set circuit 12232.

The transmission mode set circuit 12232 delivers a strip indication each time when a normal frame other than a MAC/SMT/token is received, on condition that the transmission flag is on and CNT>0. Upon reception of the token free (TKFre) notice from the stage decoder 12237, the transmission mode set circuit 12232 turns off TFG of the transmission flag set circuit 12233 to continue the strip operation until CNT becomes 0.

If TFG becomes off and CNT becomes 0, the operation returns to the repeat stage. When the transmission mode set circuit 12232 receives a token from receive frame solve means 1222, the operation returns to the repeat stage.

2.6 SA Match Mode

An SMT frame is usually transmitted under the condition of SA=MA so that stripping the circulated SMT frame can be made in accordance with SA match. An SA match circuit 12228 is provided within receive frame solve means 12222 (FIG. 6) to strip a received frame with SA=MA.

Specifically, an SA of a transmission frame is previously stored in an SA register 122281 of the SA match circuit 12228 under control of the microprocessor 15. The SA register 122281 is constructed of Ind.SA register and Gr.SA register in correspondence with an individual address and group address, respectively. The individual address and group address can be discriminated depending upon whether the first bit of the SA filed of a receive frame is 0 or 1. The FC decoder 1222A checks the address bit (L) in the FC field and discriminates that the length of DA and SA is 16 bits when L=0, and 48 bits when L=1. This discrimination is notified to the SA match circuit 12228.

In addition, the mode register 12231 of strip direct means 1223 (FIG. 7) is set at the SA match mode to enable stripping in accordance with SA match.

2.7 LLC/SMT Mixed Transmission

The frame strip method has been described above for the case where the strip mode is switched between first and second modes respectively for SMT frame transmission and normal frame (LLC frame) transmission. An SMT frame can be stripped in accordance with SA match as described with the above embodiment.

As a modification of this embodiment, a mixed mode will be described which allows a mixed transmission of an SMT frame and LLC frame. For the mixed transmission of an SMT frame and LLC frame, the microprocessor 15 resets the strip restrain mode and sets the SA match mode. Namely, an SMT frame is transmitted in the strip mode and a receive SMT frame is not counted. A transmission SMT frame on the other hand is counted because a transmission frame discrimination is not carried out. In this concern, in order not to have an mismatch between transmission/receive counts, the microprocessor 15 presets the number of SMT frames to be transmitted in the receive counter 122362. In this case, however, resetting the receive counter is inhibited also upon capture/receive of a token.

The embodiment described in detail above has the following advantages:

(1) it is possible to ensure transparency of a forward frame.

(2) a returned transmission frame can be stripped with simple hardware.

(3) no disturbance of FDDI protocol.

(4) frame infinite circulation can be avoided which might otherwise occur because of mismatch of transmission receive frame numbers.

(5) a ring recovery process is not disturbed.

(6) a transmission frame transmitted by a station can be prevented from being stripped while another station transmits a frame.

3. 2ND EMBODIMENT

Another embodiment of this invention will be described below with reference to the accompanying drawings.

Figure 13:
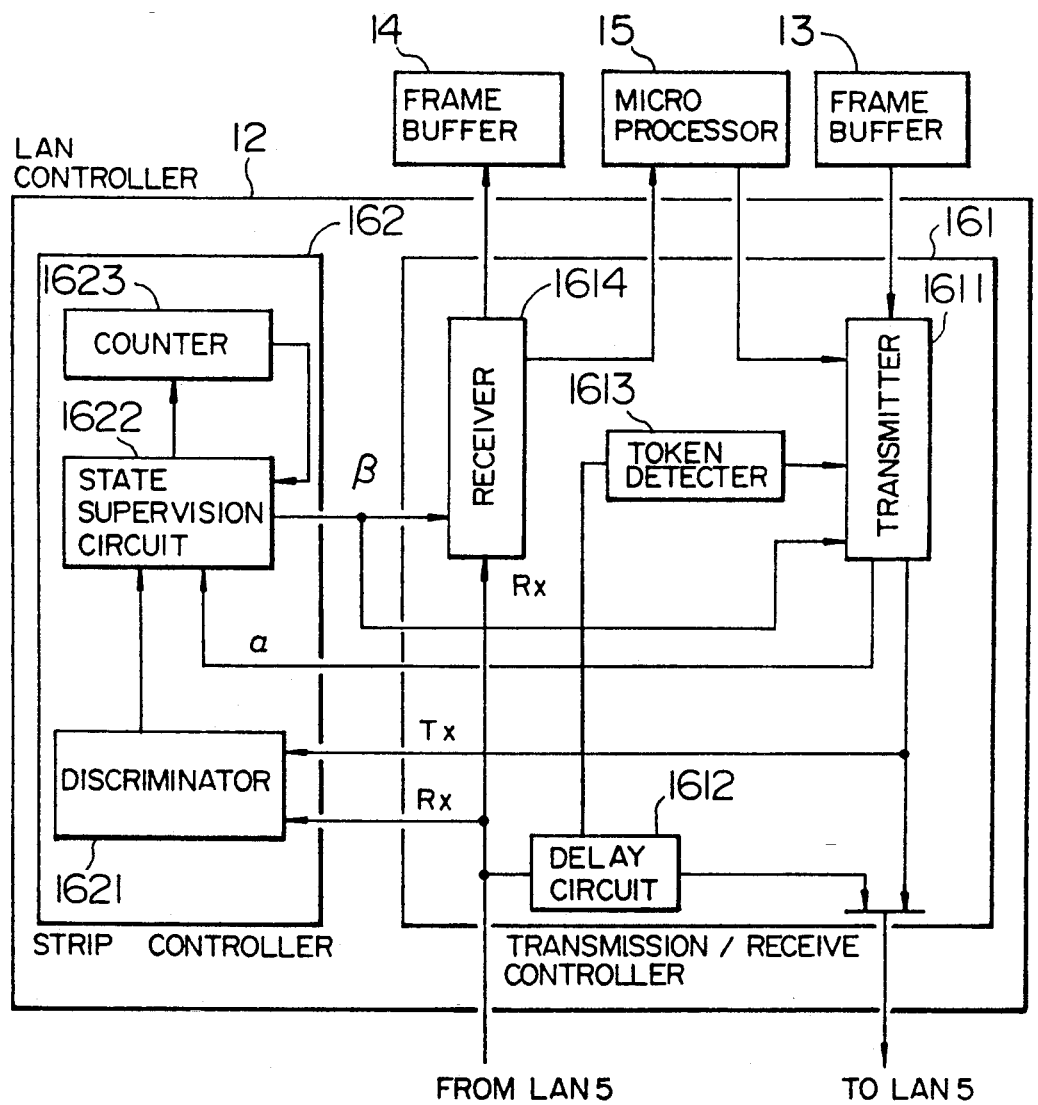
FIG. 13 is a block diagram showing another embodiment of the LAN controller 12 of this invention.

In FIG. 13, reference numeral 12 represents a LAN controller, 161 a transmission/receive controller, 1611 a transmitter, 1612 a delay circuit for repeating data received from a ring 1613 a token detector for detecting a token from the data received by the delay circuit 1612, and 1614 a receiver.

Reference numeral 162 represents a strip controller, 1621 a discriminator for discriminating between frame kind, frame error and token in accordance with transmission/receive data and generating a status, 1622 a state supervision circuit for supervising the state of transmission/receive, and 1623 a counter for counting the number of transmission/receive frames.

The transmission process will be described first.

In order to transmit a forward frame, the microprocessor 15 activates the transmitter 1611 which in turn waits for capturing a token. A token is captured when the token detector 1613 detects a token from the data flowing the delay circuit 1612. When the token is captured, the transmitter 1611 issues a transmission start notice $\alpha$ to the state supervision circuit 1622 and sequentially sends frames within the frame buffer 13 to the ring.

A transmission frame circulates the ring once and reaches its own station. This returned my transmission frame is stripped in the following manner.

The discriminator 1621 discriminates between a transmission frame/token and receive frame/token having the format as shown in FIG. 12 and sent from a transmission bus Tx and receive bus Rx, and its status is continuously notified to the state supervision circuit 1622. The state supervision circuit 1622 operates in accordance with the status and the stage matrix shown in FIG. 2, and gives a frame strip indication $\beta$ to the receiver 1614. In FIG. 13, TFG represents a transmission flag and CNT represents a counter.

Upon reception of a strip indication $\beta$, the transmitter 1611 disconnects the path from the delay circuit and delivers an idle signal to strip a returned my transmission frame. If transmission and strip occur at the same time, a returned my transmission frame is stripped when transmission data is delivered. By the time before the start of the strip operation, the start of a receive frame has already been repeated to the ring. However in this case, the receive frame can be made an invalid frame as shown in FIG. 12c by stripping at least the end delimiter (ED) of the receive frame.

The receiver 1614 on the other hand aborts the returned frame because it is not required to be repeated.

Figure 14:
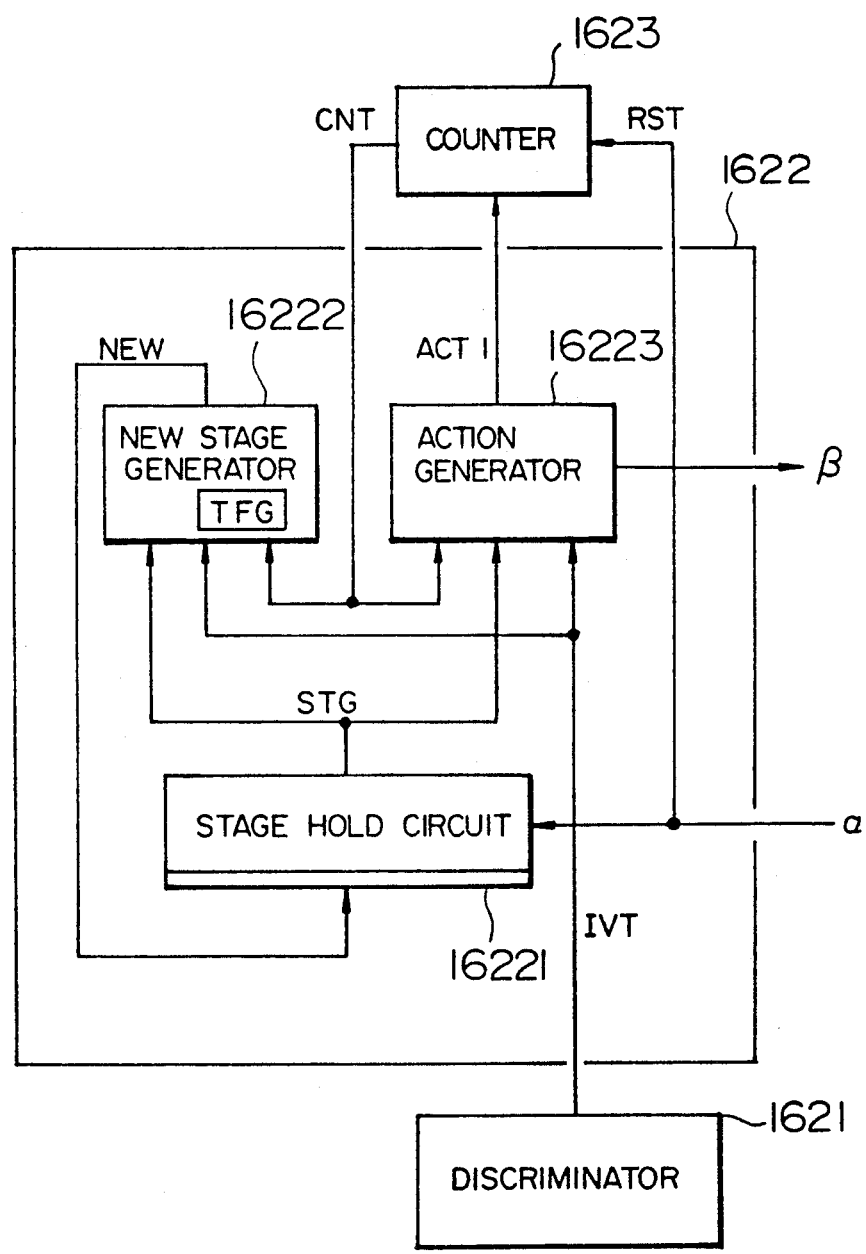
FIG. 14 is a block diagram showing an embodiment of the state supervision circuit 1622 shown in FIG. 13.

Next, the operation will further be described in detail with reference to FIG. 14 showing the detail of the state supervision circuit 1622 and with reference to the stage matrix shown in FIG. 2. A stage hold circuit 16221 holds a repeat/strip stage.

For instance, when a token is captured (when a transmission start indication $\alpha$ is received), the stage hold circuit 16221 transits to the strip stage and a counter 1623 is reset (RST). An action generator 16223 receives the current stage (STG) from the stage hold circuit 16221 and causes the counter 1623 to be incremented each time a frame is transmitted and decremented each time a frame is received (ACT1). The relationship of transmission number>receive number means that my transmission frame is present on the ring. A frame received during this condition can be judged as a returned my transmission frame. Accordingly so long as the count (CNT) of the counter 1623 is 0 or larger, the action generator 16223 delivers the strip indication signal $\beta$ to strip a returned my transmission frame. An event (IVT) such as frame transmission/receive is issued by the discriminator 1621. The transmission flag (TFG) representative of transmission is held by a new stage generator 1622, the flag being turned on during transmission.

If a token is transmitted thereafter, the transmission is terminated so that the new stage generator 16222 turns off the transmission flag (TFG). The action generator 16223 continues to strip all my transmission frames present on the ring and returned to its own station (until the count becomes 0). The conditions that all frames present on the ring have circulated once are that the transmission flag (TFG) is off and the count (CNT) is 0. When the conditions are satisfied, the new stage generator 16222 causes the stage hold circuit 16221 to return to the repeat stage, and the strip operation is terminated.

The above operation is for the normal case. Next, the operation for the abnormal case will be described. The problems associated with the abnormal case have been described with the first embodiment.

There will be described the detailed operation of this embodiment when an error frame occurs. Only normal frames are counted and the criteria for validity judgment include the following conditions which conform with the FDDI specification:

(1) of having a start delimiter;
(2) of having FC excepting "1X00 0000";
(3) of having an added data symbol of 0 or larger;
(4) of having an end delimiter;
(5) of having an effective data length;
(6) of having an effective FCS; and
(7) of not having an error indication in the frame status field.

Verification of these conditions is made by the discriminator 1621 and sent to the action generator 16223. If the validity of a receive frame is not satisfied, the action generator 16223 issues the strip indication $\beta$ but the counter 1623 is not incremented. Therefore, frame infinite circulation can be avoided which might otherwise occur due to mismatch between transmission/receive numbers.

Next, how a MAC frame is processed will be described.

As described with the first embodiment, if a MAC frame is received during the strip stage, it is not stripped but repeated to the ring to transit to the repeat stage.

The kind of frame is discriminated by the discriminator 1621 while referring to the control field FC (FIG. 12D) of a receive frame (IVT). Specifically, when the discriminator 1621 issues a MAC frame receive notice, the action generator 16223 inhibits a strip operation and the counter 1623 is reset. The new stage generator 16222 on the other hand causes the stage hold circuit 16221 to return to the repeat stage.

Next, how an SMT frame is processed will be described.

An SMT frame is not stripped as described with the first embodiment. In view of this, an SMT frame is not counted as a receive frame and it is repeated. A returned by transmission SMT frame is not also counted as a receive frame, and a my transmission SMT frame is not counted as a transmission frame in order to make the receive number match the transmission number. In this case, a strip indication is not issued when a returned my transmission SMT frame is received. However, an SMT frame is transmitted under the condition of SA=my address, it can be stripped in accordance with usual SA match. Judgment of SA match is made by the receiver 1614 for example. Discrimination of the kind of frame is made by the discriminator 1621 similar to the case of MAC frame.

It is also necessary to terminate the strip operation if a transmission frame does not circulate once after the end of transmission (after transmitting a token) because of a transmission line failure. This termination is performed in the following manner. After the end of transmission (after transmitting a token), a timer (called a strip timer) is activated and thereafter, it is re-started each time a frame is received. If the strip timer becomes time-up before the last frame is received (count=0), the strip operation is terminated.

Another embodiment for detecting a frame strip will be described.

If the transmission/receive counter cannot count the receive number upon occurrence of frame vanishment, only the transmission number increases. If the transmission number takes a certain value after all frames have been transmitted (after a token has been transmitted), it can be judged that there is a transmission frame which did not circulate once. This value may be set at the maximum number of frames allowed to be present on the ring.

For example, assuming that the loop transmission delay is 2 bytes and the maximum number of stations is 500, the delay time becomes 2 bytes×500=1000 bytes. Accordingly, the maximum number of resident frames becomes 1000 bytes / (shortest frame 20 bytes + shortest preamble 6 bytes )=39 frames.

Taking a safety factor into consideration, the value may be set at 80 frames. If the count becomes 80 or more, it can therefore be judged as the end of frame strip and the strip operation is terminated.

In the embodiment described above, a returned my transmission frame can be detected and stripped irrespective of SA of a transmission (forward) frame. The embodiment therefore has the following advantages:

(1) it is possible to ensure transparency of a forward frame.

(2) a returned transmission frame can be stripped with simple hardware.

(3) no disturbance of FDDI protocol.

(4) frame infinite circulation can be avoided which might otherwise occur because of mismatch of transmission/receive frame numbers.

(5) a ring recovery process is not disturbed.

(6) a transmission frame transmitted by a station can be prevented from being stripped while another station transmits a frame.

4. 3RD EMBODIMENT

The third embodiment of this invention will be described with reference to the accompanying drawings.

According to the strip method of this invention, SA of a transmission frame (hereinafter abbreviated as transmission SA) is stored and SA is compared with SA of a receive frame when it is received (hereinafter abbreviated as receive SA). If there is a match between both SAs, the receive frame is judged as a returned by transmission frame and is stripped.

A strip controller will be described below, and the description for the transmission/receive controller is omitted because it is the same as the embodiment described above.

Figure 15:
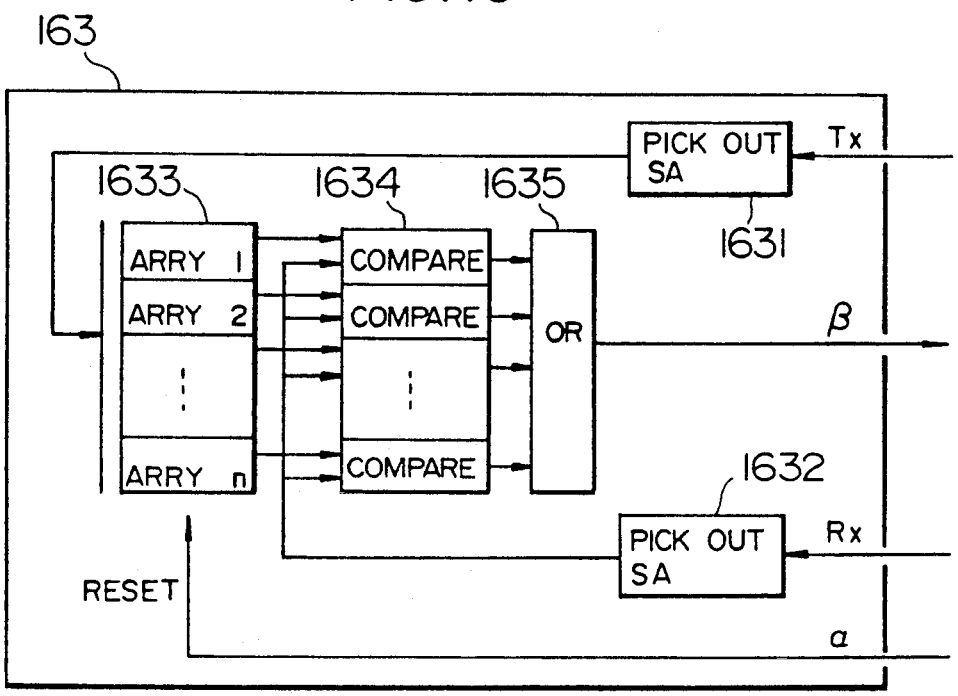
FIGS. 15 to 17 are block diagrams showing other embodiments of the strip controller of this invention.

In FIG. 15, reference numeral 163 represents a strip controller, 1631 a transmission SA pick-out circuit for picking out SA from a transmission frame, 1632 a receive SA pick-out circuit for picking out SA from a receive frame, 1633 a memory for storing a transmission SA which is constructed of N parallel registers, 1634 a comparator for a match comparison between a transmission SA in the memory 1633 and a reception SA, and 1635 an OR logic.

The transmission SA pick-out circuit 1631 picks out SA of a transmission frame from a transmission bus Tx each time a transmission frame is transmitted, and sequentially writes SAs in registers 1 to n of the memory 1633. The receive SA pick-out circuit 1632 on the other hand picks out SA of a receive frame from a receive bus Rx each time a receive frame is received, and sends it to the comparator 1634. The comparator 1634 compares the contents of all registers of the memory 1633 with a receive SA in parallel at the same time. If there is one or more SAs matching the receive SA, a strip indication b is issued. The strip method by the transmission/receive controller 161 is the same as described previously.

The memory 1633 is reset by a transmission start indication a (token capture). It is therefore sufficient if the number of registers is the total number of frames which can be transmitted upon token capture. If the register n becomes full, the register 1 may be overwritten so that it is sufficient that if the number of registers is the number of frames circulating on the ring at a ring circulation delay interval. According to the FDDI specification conforming with ANSIX3T9.5, the maximum ring circulation delay is 1.617 msec, transmission rate is 100 M bps, and maximum frame length + inter-frame space is 28 bytes, so that the maximum number of frames allowed to be present on the ring at the same time becomes 722.

With the embodiment described above, a returned my transmission frame can be stripped even if there are a plurality of SAs of transmission (forward) frames.

The embodiment therefore has the following advantages:

(1) it is possible to ensure transparency of a forward frame.

(2) a returned my transmission frame can be reliably stripped even if there occurs an error frame or vanished frame, because SA of the following frame can be compared with its transmission frame.

(3) since a special frame is not transmitted, the transmission process becomes simple and traffic will not increase.

(4) no disturbance of FDDI protocol.

In this embodiment, the transmission SA and receive SA are compared in parallel. Since registers are constructed of a memory in this embodiment, the amount of hardware increases. This problem is solved by the following embodiment.

5. 4TH EMBODIMENT

A further embodiment of this invention will be described below.

According to the strip method of this embodiment, SAs of transmission frames are stored in a FIFO, and a transmission SA is picked out and compared with the receive SA when a returned my transmission frame is received. FIFO can be realized by a RAM.

A strip controller will be described below, and the description for the transmission/receive controller is omitted because it is the same as the embodiment described above.

Figure 16:
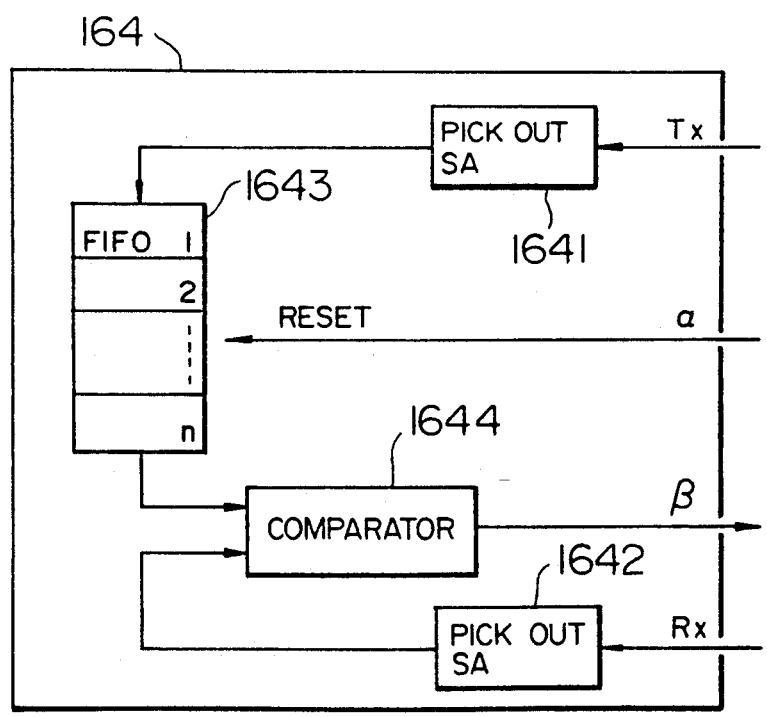

In FIG. 16, reference numeral 164 represents a strip controller, 1641 a transmission SA pick-out circuit for picking out SA from a transmission frame, 1642 a receive SA pick-out circuit for picking out SA from a receive frame, 1643 a FIFO for storing a transmission SA, and 1644 a comparator for a match comparison between a transmission SA picked out from FIFO and a reception SA.

The transmission SA pick-out circuit 1641 picks out SA of a transmission frame from a transmission bus Tx each time a transmission frame is transmitted, and sequentially stores SAs in FIFO 1643. The receive SA pick-out circuit 1642 on the other hand picks out SA of a receive frame from a receive bus Rx each time a receive frame is received, and sends it to the comparator 1644. The comparator 1644 compares a transmission SA picked out from FIFO with a received SA. If a match therebetween is detected, a strip indication b is issued. The strip method by the transmission/receive controller 161 is the same as described previously.

FIFO 1643 is reset by a transmission start indication a. It is therefore sufficient if the number of FIFO stages is the total number of frames circulating on the ring at a ring circulation delay interval. As described previously, the number of FIFO stages becomes 722.

The embodiment therefore has the following advantages:

(1) it is possible to ensure transparency of a forward frame.

(2) since FIFO is usually realized by a RAM, the amount of hardware can be reduced.

(3) since a specific frame is not transmitted, the transmission process becomes simple and traffic will not increase.

(4) no disturbance of FDDI protocol.

6. 6TH EMBODIMENT

The above-described embodiments using the parallel comparison method is effective for the case where a vanished/error transmission frame occurs. However, the amount of hardware is large. With the embodiments using the serial comparison method, the amount of hardware is small, but if there occurs a vanished transmission frame, its SA cannot be picked out from FIFO so that the pair of transmission/receive SA becomes incomplete and a returned my transmission frame will fail to be stripped.

This embodiment solves this problem by incorporating the advantages of both the methods.

Figure 17:
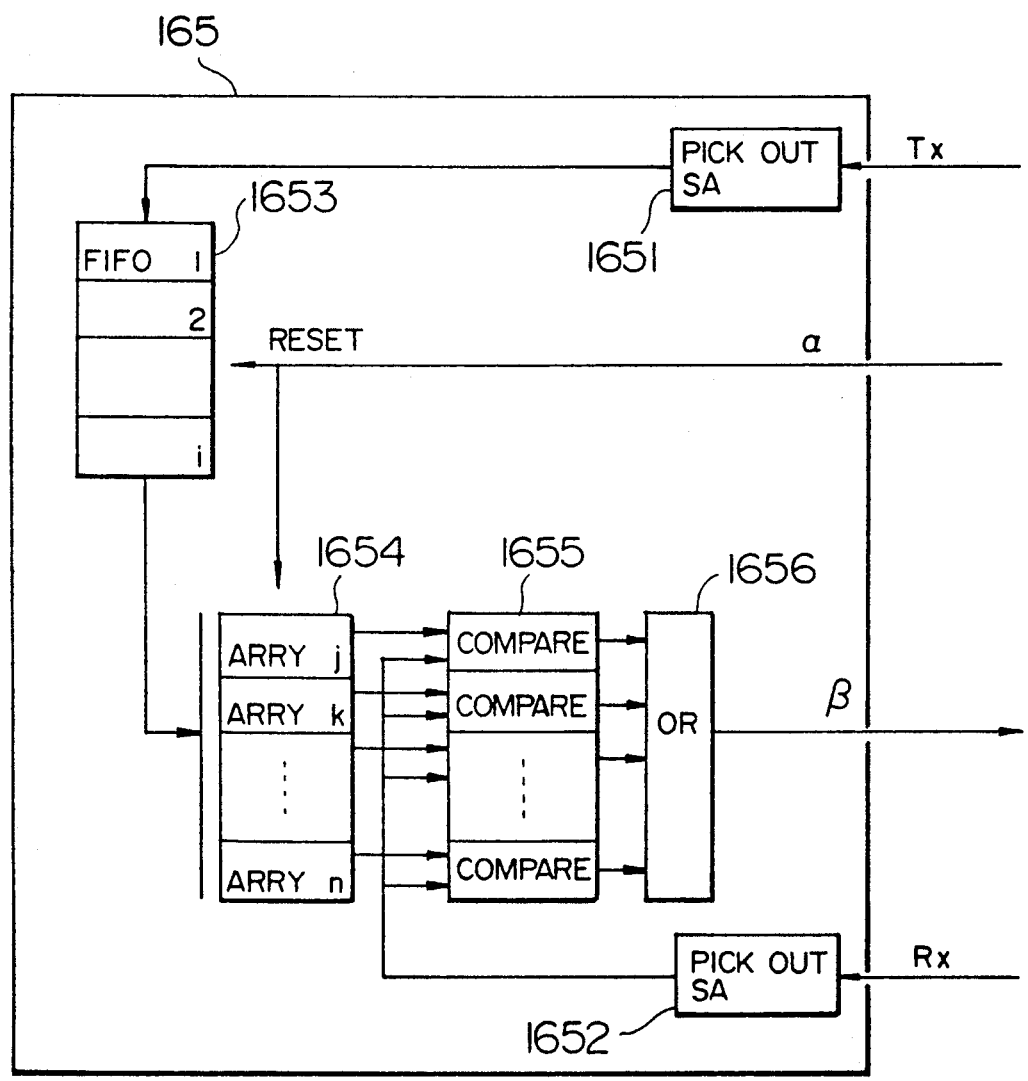

In FIG. 17, all transmission frames staying on the ring can be stored in FIFO 1653 and parallel registers 1654. The number of FIFO stages plus the number of arrays of registers corresponds to the number of all transmission frames.

The parallel registers 1654 absorb the incomplete pair of transmission/receive SA caused by a vanished transmission frame, to thereby avoid a failure of strip.

Transmission lines SAs are stored in the following manner.

Transmission SAs are stored in the parallel registers 1654 via FIFO 1653, and a those unable to be stored in the parallel registers are stored in FIFO 1653. Since FIFO 1653 can be realized by a RAM, a large capacity thereof is readily obtained.

A receive SA is compared with the contents of the parallel resisters in parallel at the same time. If there is any match, a strip indication b is issued. In addition, the transmission SA is picked out of FIFO 1653 and overwritten in the register array whose contents got a match. As described above, the parallel registers absorb a vanished transmission frame, whereas FIFO absorbs a ring delay.

The embodiment therefore has the following advantages:

(1) it is possible to ensure transparency of a forward frame.

(2) even if a transmission frame vanished on the ring, the following returned transmission frame can be detected to thereby ensure a reliable frame strip.

(3) the amount of hardware can be reduced.

(4) since a special frame is not transmitted, the burden on the transmission process can be reduced.

(5) no disturbance of FDDI protocol.

What is claimed is:

1. A frame strip method for a communication apparatus connected between two ring type transmission lines for data transmission/receive from one ring type transmission line to the other on a frame unit basis, comprising the steps of:

checking the kind of a transmission frame;

counting said transmission frame as a transmission frame number if said transmission frame is a first kind;

checking the kind of a receive frame;

counting said receive frame as a receive frame number if said receive frame is a normal first kind;

stripping said receive frame if said transmission frame number is larger than said receive frame number and if said receive frame is the first kind.

2. The frame strip method according to claim 1, wherein said counting said transmission frame starts when a right of transmission to a one of said ring type transmission lines is given, and terminates when said transmission frame number becomes equal to said receive frame number, when another transmission right is received, or when a frame of a second kind is received.

3. A frame strip method according to claim 1, wherein said frame of the first kind is an LLC (Logical Link Control) frame or implementor frame stipulated by FDDI (Fiber Distributed Data Interface) conforming with ANSI (American National Standards Institute) 3T9.5.

4. A frame strip method according to claim 2, wherein said frame of the second kind is a MAC (Media Access Control) frame stipulated by FDDI conforming with ANSI3T9.5.

5. A frame strip method according to claim 1, wherein said frame of the normal first type is a frame excepting a frame with an error indication and a frame with an FCS (Frame Check Sequence) error detected.

6. A frame strip method according to claim 2, wherein said transmission right is a token defined by a LAN (Local Area Network) using a token passing scheme.

7. A frame strip method for a bridge apparatus connected to a ring type transmission line for data transmission/receive on a frame unit basis, comprising the steps of:

providing as a frame strip mode a first mode for the transmission of a frame of a first kind and a second mode for the transmission of a frame of a second kind;

stripping a receive frame if the number of transmission frames is larger than the number of receive frames during said first mode; and stripping a receive frame if an address of said bridge apparatus is coincident with a source address in said receive frame during said second mode.

8. A frame strip method according to claim 7, wherein the number of receive frames is counted if said receive frame is the first kind and normal during said first mode.

9. A frame strip method according to claim 8, wherein said frame of the first kind is an LLC frame or implementor frame stipulated by FDDI conforming with ANSI3T9.5.

10. A frame strip method according to claim 7, wherein said frame of the second kind is a SMT (Station Management) frame stipulated by FDDI conforming with ANSI3T9.5.

11. A frame strip method according to claim 8, wherein said frame of the normal first type is a frame excepting a frame with an error indication and a frame with an FCS error detected.

12. A frame strip apparatus connected to a ring type transmission line for data transmission/receive on a frame unit basis, comprising:

storage means for storing source discrimination information of a transmission frame, said storage means comprising a FIFO (first-in first-out) and a plurality of parallel storage areas; and means for comparing source discrimination information of a receive frame with the contents of said storage means and stripping said receive frame from said transmission line if the contents include said source discrimination information;

wherein said source discrimination information of said transmission frame is stored in said storage means at said plurality of parallel storage areas via said FIFO, and said comparison is executed in parallel by comparing said source discrimination information of a receive frame with a plurality of contents of said plurality of parallel storage areas.

* * * * *